Patented July 18, 1939

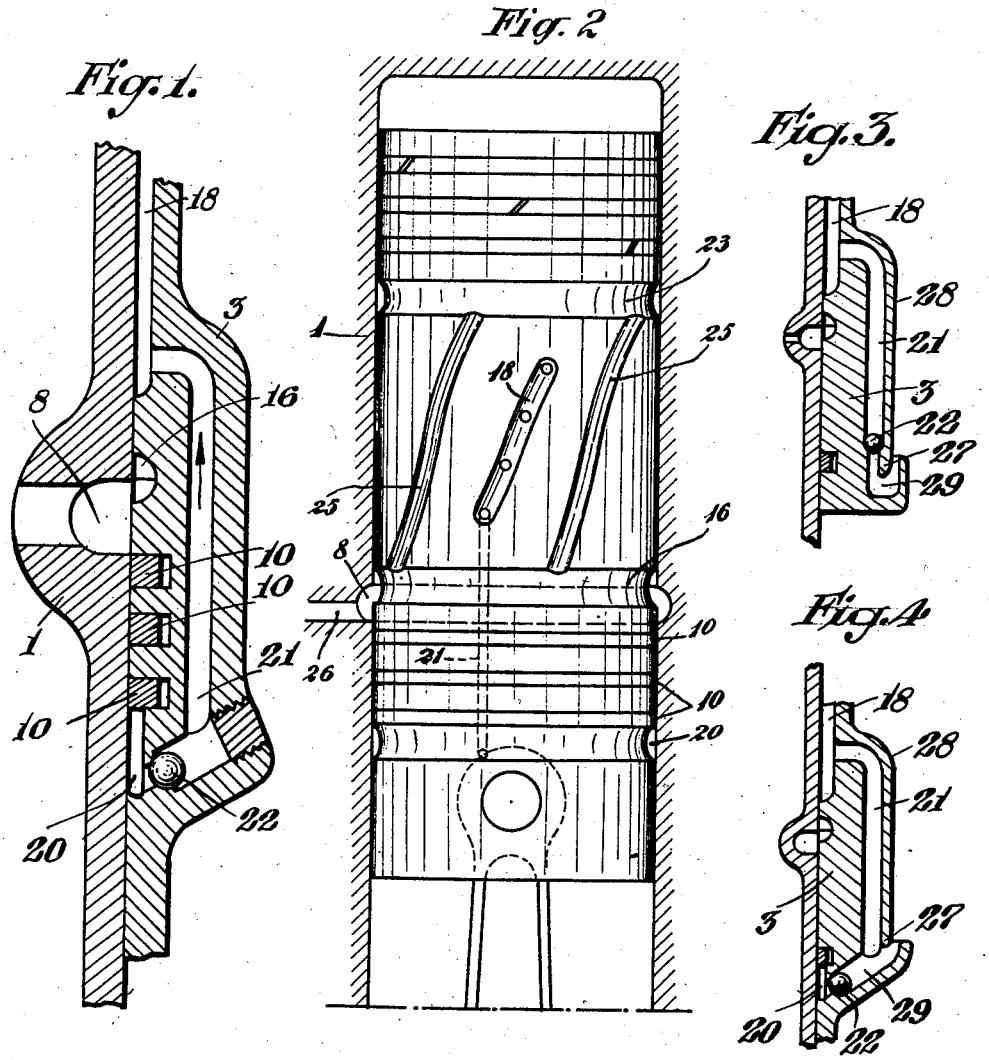

2,166,857

UNITED STATES PATENT OFFICE 2,166,857

LUBRICATING DEVICE

Jean Bugatti, Molsheim, France

Application October 3, 1935, Serial No. 43,430
In France October 6, 1934

7 Claims. (Cl. 309—8)

The present invention concerns a lubricating device applicable to pistons reciprocable in engine cylinders. This device is more especially applicable to pistons of great length or to pistons having two spaced apart sets of packing rings, one at each end because, in this case, the middle part is liable to be insufficiently lubricated. In order to facilitate the description of the invention, it will be supposed that the piston moves in a vertical direction.

The lubricating device according to the present invention is of the type in which the flow of lubricant to the parts to be lubricated is produced by the effect of inertia.

According to the invention, the lubricating device, which is associated with the piston, includes channels or pipes interposed between oil grooves or channels provided in the piston and an auxiliary reservoir of lubricant associated with the piston, the device being provided with check valves or the like which impose a unidirectional flow of the lubricant driven by the effects of inertia, in the course of the reciprocating movements of the piston.

In an embodiment of the invention, the auxiliary reservoir consists merely of a peripheral groove provided in the piston and collecting, through one of its edges, the excess of oil driven by the packing rings of the lower part of the piston or by the lower edge of said piston.

A lubricating device as above set forth may advantageously be used in combination with a piston having a set of packing rings at either end thereof and, between these two sets of packing rings, two annular grooves connected together by longitudinal grooves, these various grooves serving to convey toward a leakage collector the gases that have leaked past the packing rings. In this case, the auxiliary reservoir is located at the lower part and is capable of collecting oil below the lowermost packing ring. As a modification, or in combination with the above described arrangement, or again independently thereof, the reservoir may be arranged in such maner as to receive from eaves provided at the lower end of the piston the oil that drips along the inner wall of the latter. The oil driven into the lubricating grooves can, after having performed its function, be removed through the leakage collector where it can easily be separated from the gases and then recovered.

Other features of the present invention will result from the following detailed description of specific embodiments thereof.

A preferred embodiment of the present invention will be hereinafter described, with reference to the accompanying drawing. given merely by way of example, and in which:

Fig. 1 shows, on a large scale and in vertical section, the lubricating device according to the invention, as applied to a piston including grooves associated with a leakage collector.

Fig. 2 shows in elevation view on a smaller scale, a piston similar to that shown on Fig. 1, the cylinder in which said piston works and the leakage collector.

Figs. 3 and 4 illustrate two modifications of the arrangement shown on Fig. 1.

Referring to Figs. 1 and 2 wherein like reference characters denote like parts, cylinder I is provided with a collector 8 intended to permit the evacuation of the gases and liquids that have leaked past the upper packing rings (not shown in the drawing) of the piston 3. Lubrication of said piston 3 is ensured through oil grooves or channels such as 18. At 16 there is provided an annular groove through which the leakage gases and liquids are led to collector 8. Groove 16 communicates through one or several oblique grooves 25 (Fig. 2), with a peripheral groove 23 provided at the upper part of the piston but below the upper packing rings.

Below packing rings 10, there is provided a groove 20 for the accumulation of oil, in which is collected, in the course of the downward stroke of piston 3, the oil scraped by the lowermost of packing ring. This groove 20 communicates, through a conduit 21, provided with a check valve or equivalent member, such as a ball 22, with the lubrication groove or oil channel 18. When piston 3 moves in the downward direction, the oil present in groove 20 and the oil that has already entered passage 21 are urged in an upward direction, with respect to the piston, by the effect of inertia, so that the oil scraped by packing rings 10 is thus used for lubricating the central portion of the piston.

The oil deposited upon the inner wall of cylinder I during the upward stroke of the piston is thus utilized nearly entirely for lubricating most of the friction surface of the piston. The small amount of oil that has been able to leak past the packing rings can be evacuated through collector 8 and be recovered.

Of course, ball 22 might be replaced by any equivalent member such as a pin valve or a needle valve having a fixed or adjustable stroke.

As shown by Fig. 2, the lubricating device above described is advantageously used in combination with a piston having a set of packing rings at either end thereof and, between the two sets of packing rings, two annular grooves 23 and 16 connected together by longitudinal grooves 25.

In the modification of Fig. 3, an oil reservoir 29 is arranged in such manner as to receive from eaves 27 provided at the lower end of piston 3, the oil that drips along the piston inner wall 28; as described with reference to Fig. 1, an oil duct 21 provided with a check valve 22 extends from the oil reservoir to lubricating groove 18.

In the modification of Fig. 4 which amounts to a combination of the embodiments shown on Figs. 1 and 3, I still use a reservoir 29 adapted to receive oil from eaves 27, while it is also arranged to receive oil collected at 20 below the lowermost packing ring.

What I claim is:

1. The combination, with a piston having an auxiliary reservoir of lubricant, lubricating groove in its external surface spaced apart from said auxiliary reservoir, and a connecting passage from said auxiliary reservoir to said lubricating groove; of check means movable in said passage, responsive to inertia for closing the passage to prevent back flow of lubricant from the lubricating groove into the auxiliary reservoir, also responsive to inertia for opening the passage to permit transfer of lubricant from the reservoir to the groove.

2. The combination, with a piston having a peripheral groove in its external surface adapted to collect lubricant, a lubricating groove in its external surface spaced apart from the lubricant collecting groove and a passage extending from said lubricant collecting groove to said lubricating groove for conveying lubricant from the former to the latter; of check means movable in said passage, responsive to inertia for closing the passage to prevent back flow of lubricant from the lubricating groove into the auxiliary reservoir, also responsive to inertia for opening the passage to permit transfer of lubricant from the reservoir to the groove.

3. In combination, a cylinder; a piston adapted to reciprocate in said cylinder along the inner wall thereof, said piston having in its external surface a lubricant collecting recess and a lubricating groove spaced apart from the recess, which recess has an edge adapted to scrape lubricant from said cylinder inner wall for collection in said recess, the piston being further provided with a passage between the recess and the groove for conveying lubricant from the former to the latter; and inertia responsive means movable in said passage for imposing a unidirectional flow of lubricant therein, from said recess to said groove.

4. In combination, a piston having an open top lubricant-collecting reservoir at the bottom part of the skirt, eaves arranged on the internal wall of said skirt in overhanging relation above said reservoir for leading thereto lubricant dripping along said internal wall, a lubricating groove in the external wall of said skirt and a lubricant transfer passage between said reservoir and said lubricating groove; and valve means movable in said passage, responsive to inertia for closing the passage to prevent back flow of lubricant from the lubricating groove into the reservoir, also responsive to inertia for opening the passage to permit transfer of lubricant from the reservoir to the groove.

5. In combination; a cylinder; a piston adapted to reciprocate in said cylinder along the inner wall thereof, having a head and a body portion, said body portion being provided in a zone remote from said head with a lubricant collecting recess in sunken relief on its external surface and, in a zone intermediate said head and said recess, a lubricating groove also in sunken relief on its external surface, said body portion further including an inner communication passage directed substantially parallel with the piston axis, from said recess to the lubricating grooves; means associated with said piston, peripherally disposed between said recess and said groove, and movable with the piston for providing a seal between said piston and said cylinder; and valve means responsive to inertia, movably arranged in said passage for sealing the same to prevent transfer of lubricant from said groove to said recess while allowing transfer from the recess to the groove.

6. In combination, a substantially vertical cylinder having in its internal wall hollow means for discharging leak gas out of said cylinder; a piston adapted to reciprocate in said cylinder, having leak gas collecting grooves in the middle portion of its external surface adapted to cooperate with the hollow means, said piston being further provided with a bottom lubricant reservoir, a lubricating groove in the middle portion of its external surface spaced apart from the leak gas collecting grooves, and an internal lubricant transfer passage from said reservoir to said lubricating groove; and valve means, responsive to inertia, movably arranged in said passage for sealing the same to prevent transfer of lubricant from said lubricating groove to said reservoir while allowing transfer from the reservoir to the lubricating groove.

7. In combination, with a piston having a peripheral bottom groove for a packing device and a lubricant collecting and lift-passage leading from a recess below said bottom groove to a lubricating groove above said bottom groove at a distance therefrom, of check means movably disposed in said passage and responsive to inertia for closing the passage to prevent downward movement of lubricant therein, also responsive to inertia for opening the passage to permit upward movement of lubricant therein.

JEAN BUGATTI.